E. M. BOYNTON.
SAW-HANDLE.
No. 175,268. Patented March 28, 1876.
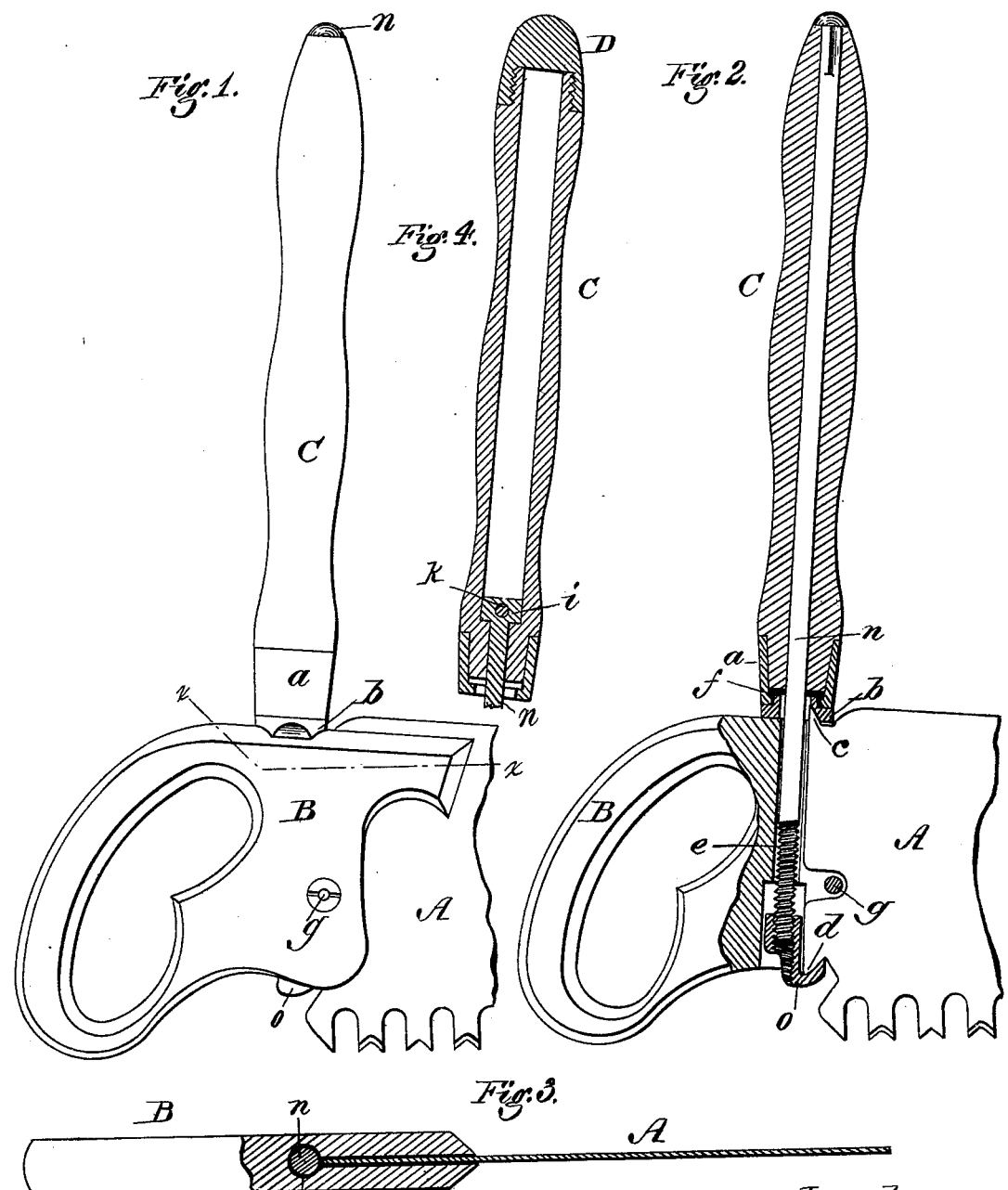
Witnesses:
Will H. Dodge
Donn Twitchell
Inventor:
E. M. Boynton
by Dodgerson
Attys.

UNITED STATES PATENT OFFICE.

EBEN M. BOYNTON, OF WEST NEWBURY, MASSACHUSETTS.

IMPROVEMENT IN SAW-HANDLES.

Specification forming part of Letters Patent No. 175,268, dated March 28, 1876; application filed February 12, 1876.

*To all whom it may concern:*

Be it known that I, EBEN MOODY BOYNTON, of West Newbury, in the county of Essex and State of Massachusetts, have invented certain Improvements in Saw - Handles, of which the following is a specification:

This invention consists in a novel arrangement of the handles of crosscut and other saws; in a peculiar construction of the handles; and in a novel manner of attaching the same to the saw-blades, as hereinafter more fully explained.

In the drawing, Figure 1 represents a side view of my improved device; Fig. 2, a longitudinal section through a portion of the same; Fig. 3, a section on the line $x\ x$ of Fig. 1, and Fig. 4 a sectional view of my improved handle.

The object of this invention is to produce, first, a light crosscut-saw for cutting off pieces of heavy timber, logs, &c., which may be conveniently handled by one person; second, a ready, cheap, and simple means of attaching the handles to the blades; and, third, a means by which files or other small tools, which are necessary or desirable to carry with the saw, may be conveniently carried.

In order to afford means for producing the necessary downward pressure upon the saw I first provide a handle, B, of the same form as that of an ordinary hand-saw, and then secure thereto an upright handle, C, as shown in Figs. 1 and 2. It will be seen that by this arrangement the handle B serves for drawing the saw back and forth, while, by pressing forward upon the handle C, (it being above the blade of the saw,) the teeth will be forced down into the wood, it only being necessary to its successful operation that the blade shall be sufficiently stiff to sustain itself and prevent buckling.

The next feature of my invention is the manner of attaching the handles above mentioned to the blade. In order to accomplish this result I provide a handle, B, which, as before stated, is of the form commonly used on handsaws, and bore through the same, from top to bottom, a hole, $e$, as shown in Figs. 2 and 3, and cut from said hole to the forward end of the handle a slit of sufficient width to receive the blade A, as shown in Fig. 3. The blade A is provided at its back end, at the top, with an ear, $c$, and at the bottom with a corresponding ear, $d$, the object of which will be explained hereafter. I next provide a handle, C, having a metal rod or bolt, $n$, passing through it from end to end, and extending some distance below the lower end of said handle, where it terminates in a screw-thread, as shown in Fig. 2. The handle C rests at its lower end upon a collar, $b$, which is seated upon the handle B, said collar having on its under side a recess to receive the ear $c$ of the blade A, as shown in Fig. 2. The rod or bolt $n$ of the handle C passes through the collar $b$, and down into the hole $e$, at the lower end of which it enters a hole in the upper end of the hook $o$. The hook $o$ engages over the ear $d$ of the blade, as shown in Fig. 2; and it will therefore be seen that when the handle C is turned the screw of the rod $n$ will draw the hook $o$ toward the collar $b$, thereby firmly securing the handles to the blade, and to each other. The collar $b$ is seated upon the handle B in such manner as to be made stationary, and is provided on its upper face with an upright flange, $f$, which projects into the open end of the ferrule $a$ on the handle C, thereby keeping the parts in position, and at the same time permitting the handle C to turn readily on the collar $b$. I also provide a convenient receptacle for files and other small tools, which it is very desirable to carry with the saw. To do this I make the upright handle C hollow, as shown in Fig. 4, and furnish it with a screw-cap, D. When the hollow handle D is used it is, of course, necessary that the rod $n$ should not extend through the entire handle, but with a head or enlargement, $i$, as shown in Fig. 4, formed upon it, it is forced into the handle C from its open end until it becomes seated in the lower end of the same, when it is secured in place by a pin, $k$, the rod $n$ projecting from the handle C, as in the solid handle.

If desired, one or more rivets, $g$, may be passed through the handle B, to prevent its splitting, a notch, $h$, being cut in the rear end of the saw for each rivet, they serving the further purpose of preventing the handle B from dropping down, away from the handle C, but this is not considered necessary, as the hook $o$ may be made to accomplish the same purpose.

It is obvious that the handle B may be secured to the blade in the usual manner, in which case the handle C will be secured as here described. This forms a simple, cheap, and durable device, and one of great utility.

Having described my invention, what I claim is—

1. In combination with a saw-blade, the handles B and C, constructed and arranged to operate substantially as shown and described.

2. In combination with the saw A, provided with the ears $c$ and $d$, the handle B, provided with the hole $e$, and the handle C, provided with the collar $b$ and clamping-hook $o$, all constructed to operate substantially as described.

3. The tubular handle C, provided with a screw-cap, D, and the bolt $n$ and hook $o$, the whole constructed to operate as and for the purpose set forth.

E. M. BOYNTON.

Witnesses:
P. T. DODGE,
W. C. DODGE.